United States Patent [19]
Von Holdt, Sr.

[11] Patent Number: 5,169,655
[45] Date of Patent: Dec. 8, 1992

[54] MULTIPLE CAVITY INJECTION MOLD

[76] Inventor: John W. Von Holdt, Sr., 6864 Lexington La., Niles, Ill. 60648

[21] Appl. No.: 781,907

[22] Filed: Oct. 24, 1991

Related U.S. Application Data

[63] Continuation of Ser. No. 532,749, Jun. 4, 1990, abandoned.

[51] Int. Cl.⁵ .............................................. B29C 45/38
[52] U.S. Cl. .................................. 425/547; 264/297.2; 264/328.8; 425/556; 425/562; 425/572; 425/588
[58] Field of Search ............... 425/547, 562, 564, 566, 425/572, 588, 556; 264/297.2, 328.8

[56] References Cited

U.S. PATENT DOCUMENTS

| | | | |
|---|---|---|---|
| 4,609,138 | 9/1986 | Harrison | 425/588 |
| 4,687,613 | 8/1987 | Tsutsumi | 425/547 |
| 4,971,747 | 11/1990 | Sorensen | 264/297.2 |
| 4,973,239 | 11/1990 | Herrmann et al. | 425/564 |
| 4,983,117 | 1/1991 | von Buren et al. | 425/564 |

FOREIGN PATENT DOCUMENTS 166030  10/1983  Japan .................................. 425/572

OTHER PUBLICATIONS

Webster's Ninth New Collegiate Dictionary, 1986 p. 1134.

Primary Examiner—Tim Heitbrink
Attorney, Agent, or Firm—Allegretti & Witcoff, Ltd.

[57] ABSTRACT

An injection mold typically defines multiple cavities. A mold gate is provided which comprises a rotary spherical member having a sprue conduit extending transversely therethrough. Highly accurate sequential molding of multiple cavities can be achieved in this manner, as well as other advantages. Also, this arrangement permits a linear, straight sprue conduit which is free of any sharp turns.

24 Claims, 4 Drawing Sheets

MULTIPLE CAVITY INJECTION MOLD

This is a continuation of application Ser. No. 532,749, filed June 4, 1990 now abandoned.

BACKGROUND OF THE INVENTION

Multiple cavity injection molds are known in various embodiments, and desireable in that a single molding apparatus can be used to mold two or more products in a single shot.

Specifically as in the prior art, an inner mold cavity member can be positioned between a pair of opposed mold cores that engage opposed sides of the cavity, to define a pair of separate mold cavities respectively positioned between the inner mold cavity member and the two, opposed mold cores. The mold cores can move in and out to define the pair of opposed mold cavities.

In the above-described conventional embodiment, the sprue for molten molding compound typically enters the mold cavity member in a direction lateral to the direction of motion of the mold cores as they move in and out between a closed, molding position and an open position which the molded products may be removed from the cavities. This necessitates a sharp-angle turn in the sprue, typically in the form of a T connection, with branch sprue lines leading to the respective, opposed mold cavities.

Such a sharp, right-angle turn in the sprue line has been found to be a disadvantage in that it increases the flow resistance of molding compound passing through the sprue, and exhibits other disadvantages as well. Particularly when large volumes of molding compound are required for filling large cavities for molding the lids of drums or the like, the angled design of the sprue, which is also of undesirable length, has been found to exhibit the disadvantages of requiring a very large molding press, and slowing down the speed of operation.

In accordance with this invention, an improvement in such a multiple cavity injection mold is provided, along with an improved mold gate. By this invention, it is possible to achieve molded products of improved dimensional tolerance, coupled with the molding of multiple products in multiple mold cavities, if desired. The multiple mold cavities may be sequentially or simultaneously molded in a single shot, while making use of the improved design of mold sprue and gate of this invention.

DESCRIPTION OF THE INVENTION

In this invention, a multiple cavity injection mold is provided which defines an inner, first mold part positioned between a pair of second mold parts to define a pair of separate mold cavities which are respectively positioned between the first mold part and each second mold part.

Means are provided for moving the mold parts between engaging, mold cavity-forming relation and spaced relation to remove product molded therein. Sprue means are also present to provide molten molding compound to each mold cavity. Typically, the first mold part is a mold cavity member that defines a pair of opposed, outwardly facing recesses that, in turn, each define a mold cavity for molding an individual part.

In accordance with this invention, the sprue means comprises a first sprue conduit communicating between a source of molten molding compound and one of the mold cavities which are defined between the first mold part and one of the second mold parts. A second sprue conduit communicates between the one mold cavity defined above and the other mold cavity, extending through the first mold part. Gate means are also provided for controlling flow through at least the second sprue conduit, although, if desired, the gate means may also control flow through the first sprue conduit.

It is preferred for the first and second sprue conduits to communicate with each other in essentially linear, straight relation, so that the sprue conduits are free of any sharp turns, to avoid the disadvantages referred to above. Preferably, the sprue conduits extend in the direction of moving of the mold parts as they open and close. Thus, it can be seen, that the path of molding compound through the sprue means to the other or second mold cavity extends through the first mold part.

The gate means provided herein preferably comprises a rotatable member which is positioned, at least in part, within the first mold part. A passageway extends essentially through the rotatable member, which passageway comprises at least a portion of the second sprue conduit. Means are provided for rotating the rotatable member between a first rotary position in which the passageway is in communication between the first sprue conduit and the other mold cavity, and a second rotary position in which the passageway is out of such communication and substantially sealed from any flow connection between the first sprue conduit or the other mold cavity.

The rotatable member is preferably substantially spherical in shape, except for its connection point or points with a shaft to rotate it. The rotatable member preferably defines a recess on its spherical surface that communicates with the one mold cavity in the second rotary position. The effect of this is to prevent flow of molding compound to the other mold cavity, but at the same time to facilitate the distribution of molten molding compound from the first sprue conduit into the one mold cavity. It has been found that a spherically surfaced rotatable member, having such a recess which is particularly of substantially circular periphery, can facilitate the uniform distribution of molding compound in all transverse directions which enters the one mold cavity through the first sprue conduit.

Thus, typically after the other mold cavity has been filled by molding compound passing through the passageway, with the rotatable member in the first rotary position, the rotatable member is rotated out of its first to its second rotary position, in which position the above recess is presented, which facilitates the subsequent rapid, efficient filling of the one mold cavity. Accordingly, both mold cavities can be filled in a single shot with a quick, intermediate rotation of the spherical rotatable member, which serves as the gate means in accordance with this invention.

In such a circumstance, it is generally preferable for the passageway of the rotatable member to be essentially sealed from the one mold cavity while in the first rotary position, so that all of the molding compound passes through the passageway into the other mold cavity. This can be particularly facilitated by the preferred substantially spherical structure of the rotatable member of this invention, as can be seen from the drawings.

It may also be preferable for means to be provided for removing molding compound from the passageway while the rotatable member is in the second rotary position, particularly when means are provided for cooling the rotatable member to cause molding compound in the passageway to harden. This then may be accomplished by a plunger which may be actuated to extend through the passageway, to punch out the cooled plug of molding compound which solidifies in the passageway between the molding shots.

Alternatively, means may be provided for heating the rotatable member to retain the molding compound in the passageway in molten condition. In this circumstance it is not necessary to clear the passageway of molding compound in between shots while the rotatable member is in the second rotary position.

It is also often desirable to use a spherical, rotatable member in conjunction with means for heating the molding compound in the passageway between shots. Such a spherical, rotary member may be substantially of the design of the previously described spherical rotary member, having a recess as described on its spherical surface to facilitate the sequential filling of the two cavities as previously described.

Alternatively, the spherical, rotary member may be configured so that both cavities may be filled simultaneously in the shot. In this circumstance, the rotary member will not rotate in the middle of the shot as before, but rather it will be rotated at the end of the shot to break away the sprue as the molding compound in both mold cavities cools, to facilitate the cooling of the molded product while retaining the molding compound in the passageway in molten form, so that it is immediately ready for the next shot after the cooled products in the mold cavities have been removed.

By the above, significant improvements in manufacturing efficiency can be obtained with respect to particularly large molded parts, in which back-to-back molding can be provided in conjunction with a single, unbranched straight sprue. Additionally, sequential molding within the mold cavities can be achieved for greater accuracy of molding if desired, for reduction of cost, coupled with highly accurate molding at an increased production rate.

DESCRIPTION OF SPECIFIC EMBODIMENTS

Figure 1:
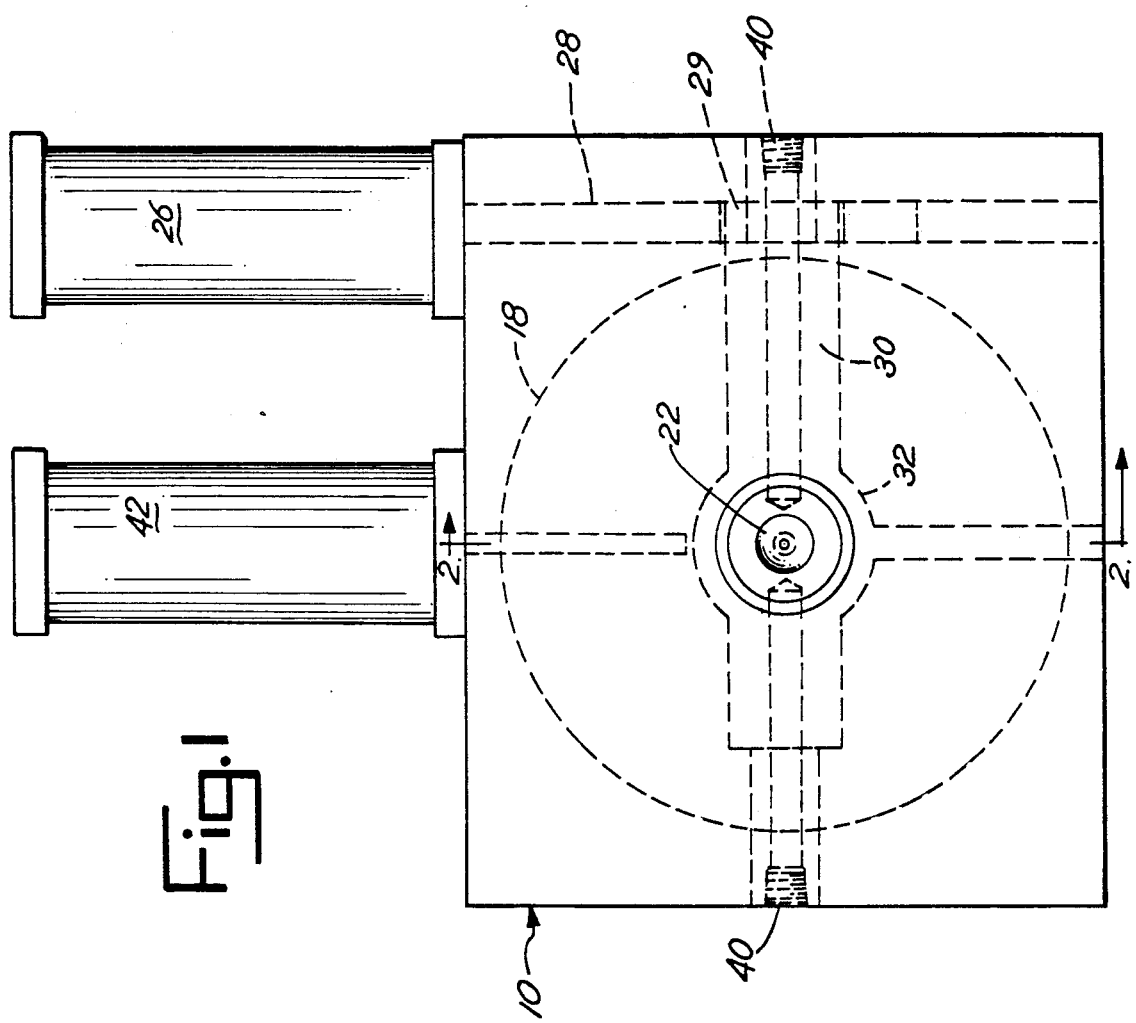
FIG. 1 is a elevational view of a multiple cavity injection mold of this invention.
Figure 2:
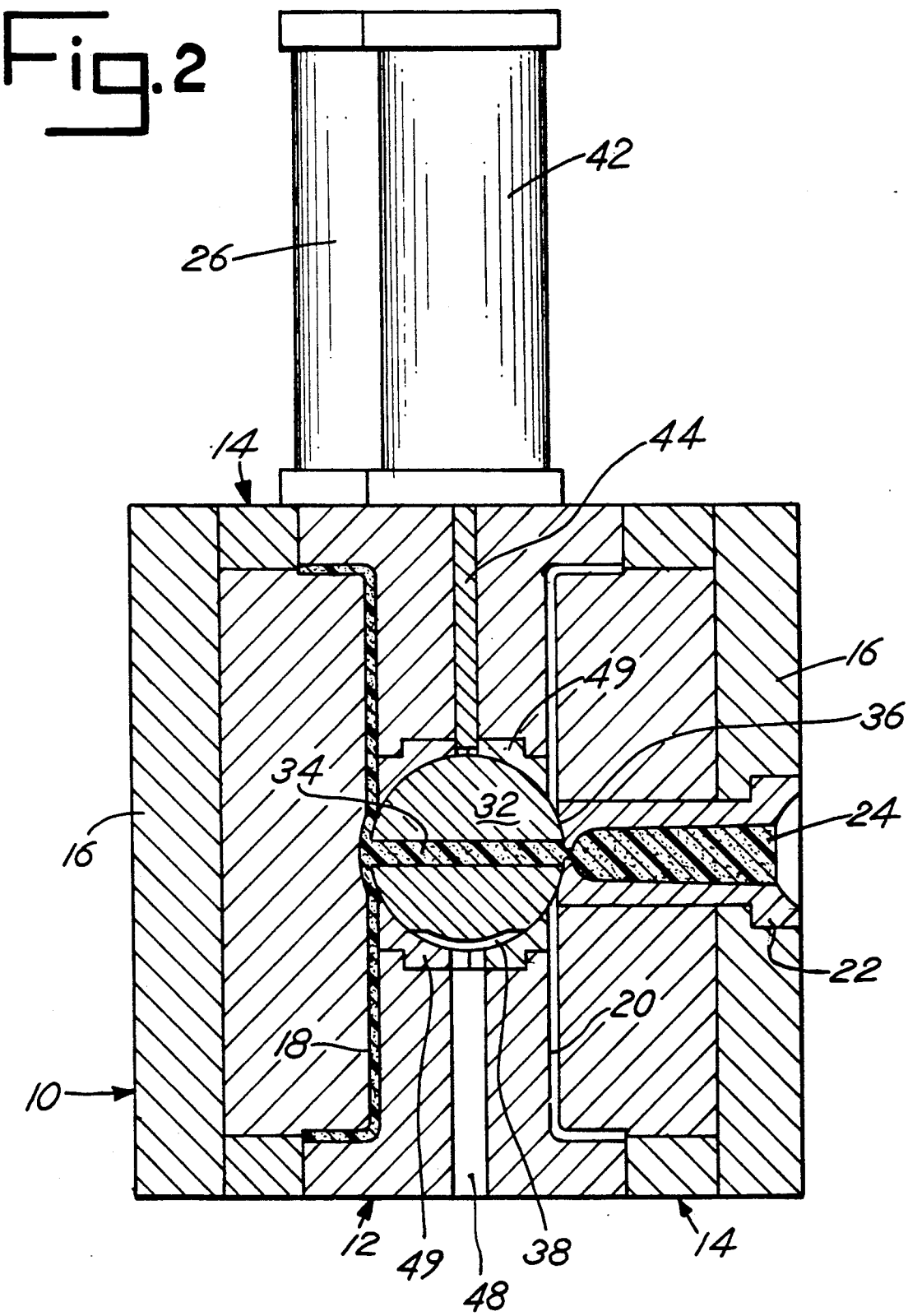
FIG. 2 is a sectional view taken along line 2—2 of FIG. 1, with other parts of the apparatus shown in elevation.

Referring to FIGS. 1 and 2, molding apparatus 10 is specifically shown to be for the purpose of molding large cylindrical caps or the like. FIG. 1 shows an end elevational view of the molding apparatus. FIG. 2 illustrates how molding apparatus 10 defines an inner, first mold cavity part 12 positioned between a pair of second mold core parts 14, which reciprocate horizontally back and forth by means of a conventional mold platen 16 which are part of conventional molding apparatus.

Inner, first mold cavity part 12 interacts with each of mold core parts 14 to respectively define a pair of separate mold cavities 18, 20. Sprue 22 is provided in conventional manner, communicating with mold cavity 20, to provide molten molding compound 24 to both cavities in accordance with this invention.

Figure 4:
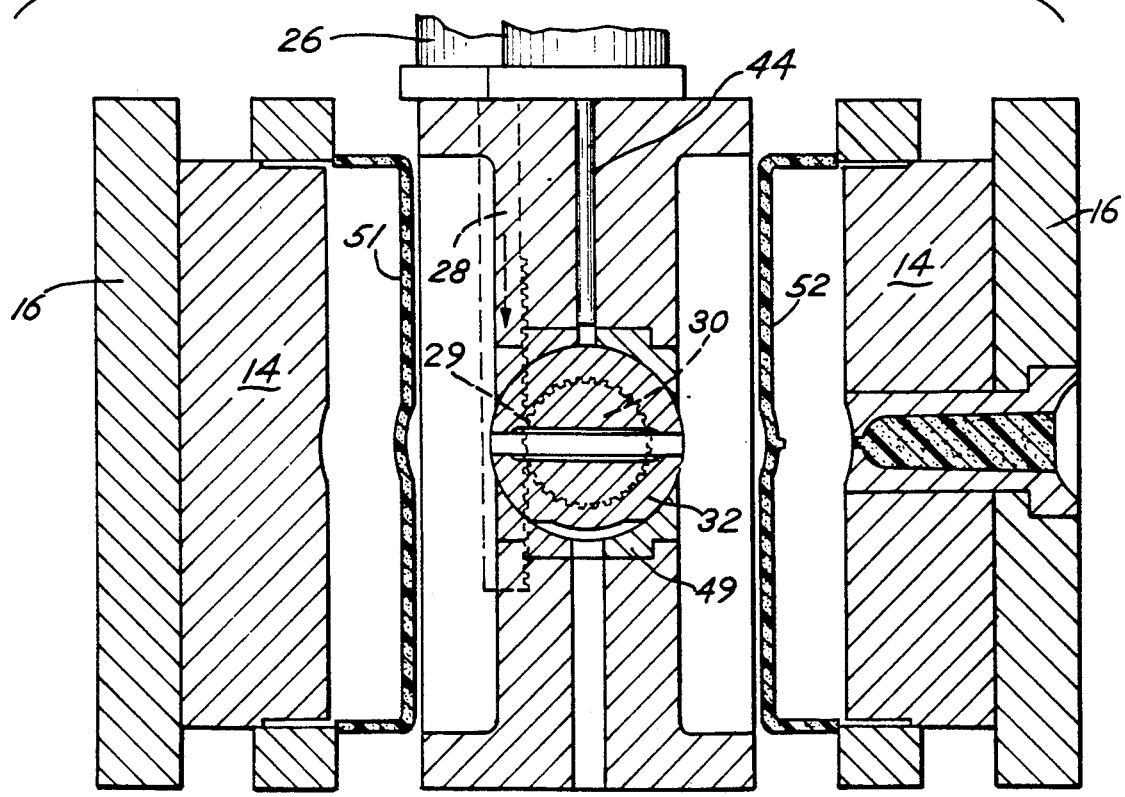
FIG. 4 is a sectional view similar to that of FIG. 3, showing the apparatus in a further step of operation, and showing added details as to how ball valve 32 is rotated.

FIG. 4 illustrates how the respective second mold core parts 14 can open for removal of the pair of products 51, 52 formed in the pair of mold cavities 18, 20.

Power cylinder 26 communicates by shaft 28 in a rack and gear arrangement 29 with perpendicular shaft 3 that is integral with or attached to ball valve 32, to cause ball valve 32 to rotate by typically 90 degrees back and forth as actuated by power cylinder 26.

As shown in FIG. 2, ball valve 32 defines a passageway 34 that extends diametrically through the valve, which, in the configuration of FIG. 2, is in essentially linear, straight relation with the flow path through sprue 22. Thus, as previously described, the flow path through sprue 22 comprises the first sprue conduit, while passageway 34 comprises the second sprue conduit.

In the configuration of FIG. 2, it can be seen that spherical valve 32 is in sliding, substantially sealing relation with the forward end 36 of sprue 22, so that essentially no leakage of pressurized molding compound 24 can take place laterally into mold cavity 20, but, rather, the pressurized molding compound passes through sprue 22, and then passageway 34, to fill cavity 18 first, as shown in FIG. 2, as the molding apparatus is in its closed, molding configuration.

Figure 3:
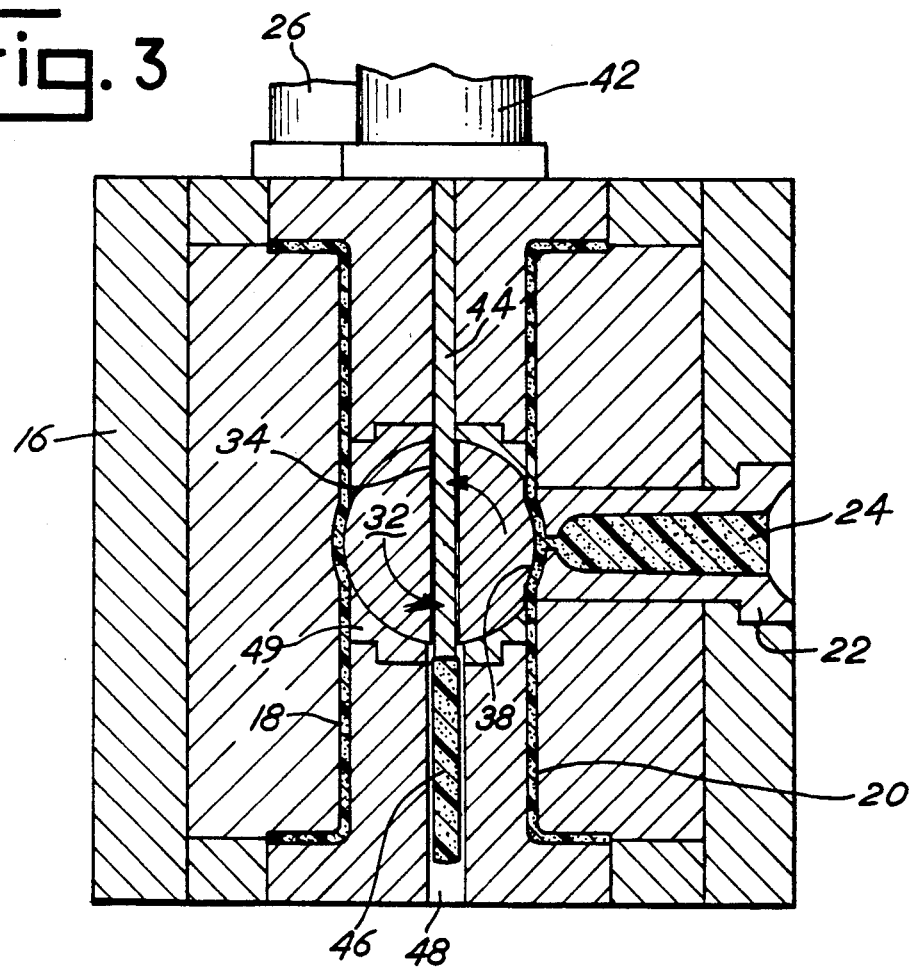
FIG. 3 is a sectional view similar to that of FIG. 2, with parts broken taken away, showing the apparatus in another step of the molding operation.

Then, as shown in FIGS. 1 and 3, power cylinder 26 causes a 90 degree rotation of spherical valve 32, so that passageway 34 no longer engages either of the mold cavities 18, 20. Thus, mold cavity 18 becomes isolated from any sprue and begins to cool. Also, recess 38, preferably of substantially circular periphery, is rotated into communication with the forward end of sprue 22, to eliminate the seal in the flow path between sprue 22 and mold cavity 20, and to provide a spreading and distribution surface to preferably facilitate the uniform, 360 degree distribution of molding compound from sprue 22 into mold cavity 20 for the filling of the same.

If rotating valve gate 32 were cylindrical in shape rather than spherical, then recess 38 could extend substantially the entire length of rotating member 32 to provide a more directional flow distribution to cavity 20, if desired. The spherical shape of valve 32 facilitates more uniform distribution of molding compound into cavities 18, 20.

Valve gate 32 may be provided with cold water or cooling lines 40 through shaft 30, for example, such access lines extending to both ends of the system. It can be seen from FIG. 1 that substantially spherical member 32 may actually be an enlarged portion of shaft 30, in which the spherical portion of valve 32 is the portion which interacts with the mold cavities and sprue 22.

Thus, during the molding operation of the mold of FIGS. 1-4, molding compound with in passageway 34 will cool into a hard mass. Then, while the mold occupies the configuration of FIG. 3, power cylinder 42 advances plunger 44 through passageway 34 to remove the solidified plug 46 of molding compound, which then can drop out of disposal passageway 48 for recycling into the apparatus, for remelting and resupply to the mold.

Then, referring to FIG. 4, after the molded products 51, 52 have solidified, second molding members 14 may be opened by moving the respective platens 16 to the open position, so that the respective parts 51, 52 fall out of the apparatus. Following this, the apparatus is closed again to the configuration of FIG. 2, and another molding cycle begins.

If desired, mold cavity 18 may be opened before mold cavity 20, since, by the molding technique described above, it has had a longer cooling time.

Valve 32 may be seated in a cooled seat 49 to help in the cooling process by facilitating heat transfer from cooling lines 40.

An advantage of the mold of this invention and the above-described system of operation is that multiple molding may be achieved while at the same time very high accuracy of dimensions of the molded item are also achievable. Thus, the molding apparatus operates at a high rate of production while using a reduced amount of space, compared with prior art systems. Additionally, the sprue flow path can be seen to be substantially linear until the molding compound reaches the desired mold cavity that it is to fill. Significant advantages of speed and reduction of stress through shear, as well as reduced back pressures, can be achieved by this apparatus and technique, and the length of the sprue flow path can be reduced.

Figure 5:
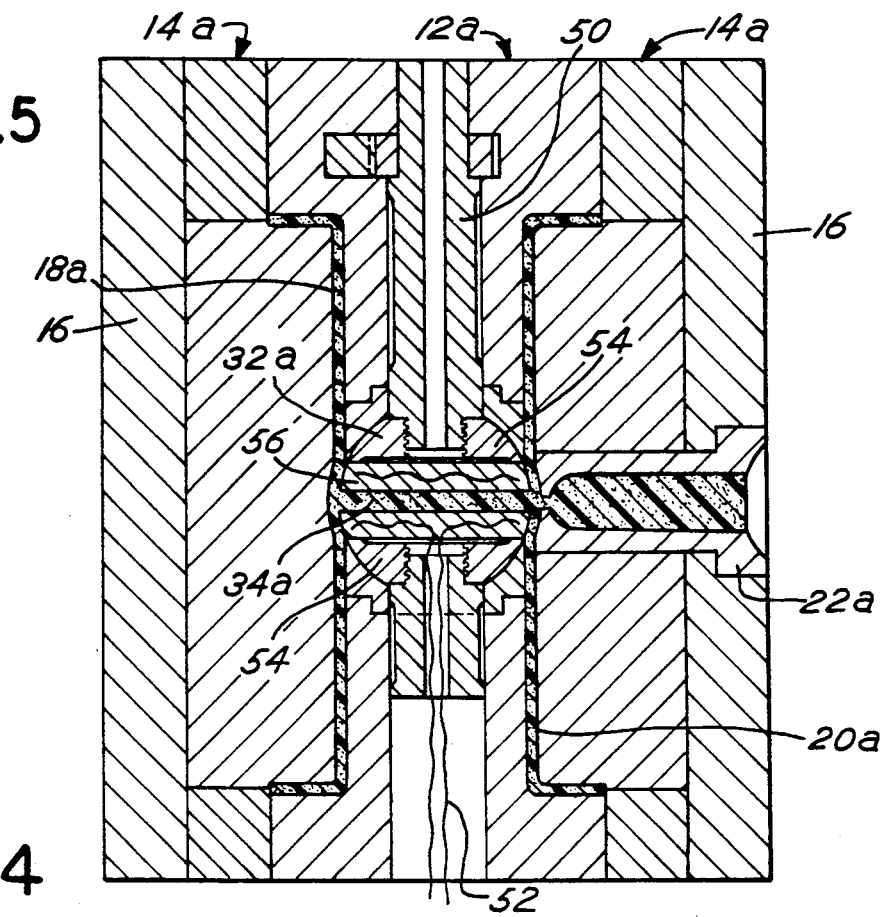
FIG. 5 is a partial, transverse sectional view of another embodiment of the apparatus in accordance with this invention.

Referring to FIG. 5, a different embodiment of the molding apparatus of this invention is disclosed, similar in many respects to the previous embodiment. In this situation, a central mold cavity part 12a is provided as in the previous embodiment, interacting with a pair of opposed mold core members 14a. As before, mold core members 14a are carried on platen 16 of a molding apparatus which may be identical to that used in the previous embodiment and of conventional design. Sprue 22a may also be unchanged.

In this particular modification, rotary shaft 50 comes in the top of the mold system rather than the side, being controlled by a power cylinder or any other desired control means to horizontally rotate spherical mold gate or valve 32a which carries a passageway 34a, both being broadly similar in structure and function to the corresponding parts of the previous embodiment. However, shaft 50 connects with spherical valve 32a in screwthreaded relation in this embodiment.

However, as one difference, in this embodiment, heater wires 52 are provided to heat a central portion of spherical valve 32a so that molding compound in passageway 34a is maintained at a molten temperature without any freezing. Outer portion 54 of spherical member 32a may be made of an insulating material such as a ceramic or a high melting plastic, so that passageway 34a is basically defined by a heated sleeve 56, while the remainder of spherical valve member 32a comprises the insulating portions 54.

For the functioning of this particular design of FIG. 5, both of mold cavities 18a, 20a may be open to molding compound in sprue 22a and passageway 34a for substantially simultaneous filling of the two mold cavities 18a, 20a. Then, when both mold cavities are filled, spherical valve member 32A may be rotated by shaft 50 horizontally (in the perspective of FIG. 5), by typically 90 degrees, to break contact between mold cavities 18a, 20a, and passageway 34a, which contains the continuously heated mold compound. Instead, mold cavities 18a, 20a face insulating material 54 of spherical valve 32a in this configuration, so that the heating of the inner parts of the spherical valve will not interfere with the complete cooling of the molded product in the respective cavities 18a, 20a.

Then, platens 16 may be opened in a manner similar to that of the previous embodiment, so that the newly formed molded members may be removed. The mold system is closed again; valve 32a is rotated back again to the configuration shown in FIG. 5; and another shot may immediately proceed because the molding compound in passageway 34a remains fluid and ready for introduction to a mold cavity.

Figure 6:
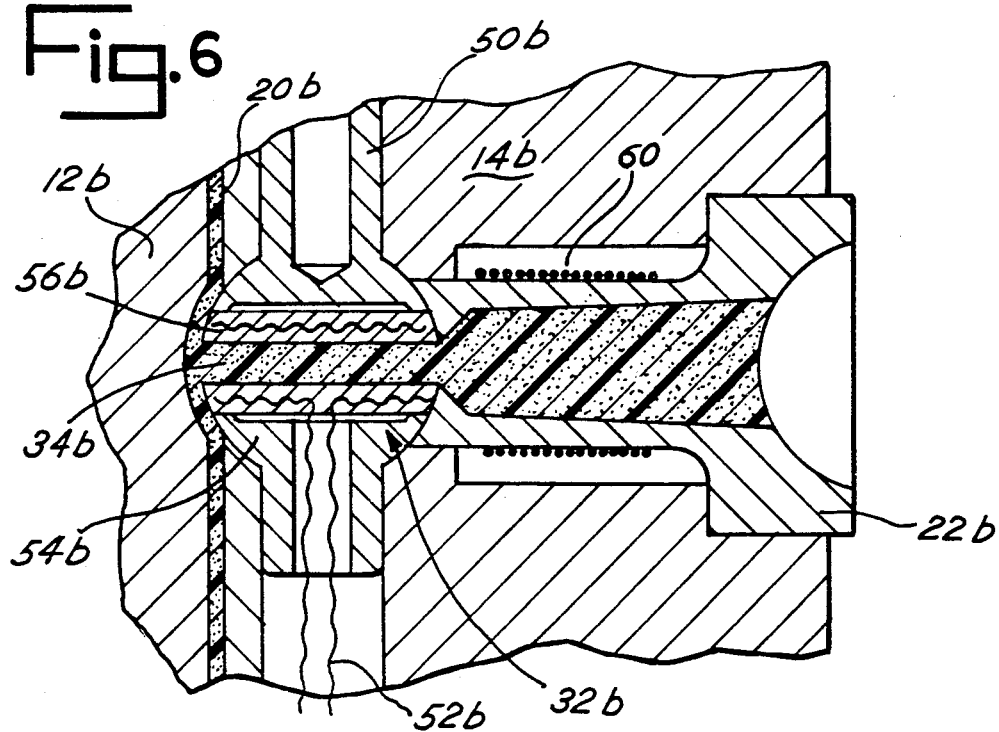
FIG. 6 is a fragmentary, sectional view of a third embodiment of the apparatus of this invention.

Referring to FIG. 6, it is shown how the invention may be applied to a single cavity mold. One mold member 12b and another mold member 14b together define a mold cavity 20b. Spherical valve member 32b may be of similar structure to that of the previous embodiment, being carried on a rotary shaft 50b, and being made integrally with the shaft rather than being in screw threaded relation as in the embodiment of FIG. 5. Passageway 34b extends through spherical valve 32b as in the previous embodiment, and is defined by an inner section 56b which is heated by conventional heating wires 52b as in the previous embodiment, while outer portions 54b of the spherical valve are made of an insulating material.

Sprue 22b communicates directly with spherical valve 32b, having a coil of optional heating wires 60 to keep the molding compound in softened condition. Such heating wires may of course be used in any of the embodiments as desired.

Thus, when the mold shot is completed, filling mold cavity 20b, spherical valve 32b may be rotated, to break the contact of passageway 34b with both the molding compound in sprue 22b and the molding compound in cavity 20b.

The mold of FIG. 6 may otherwise operate in substantially conventional manner.

Thus, a mold is provided, based on a superior new design of mold gate, which may be used for providing double mold cavities for greatly increased production with reduced space, or which may be used singly as in FIG. 6 for quality, high precision molding of a single mold cavity.

The above has been offered for illustrative purposes only, and is not intended to limit the scope of the invention of this application, which is as defined in the claims below.

That which is claimed is:

1. In a multiple cavity injection mold which defines an inner, first mold part positioned between a pair of second mold parts to define a pair of separate mold cavities respectively positioned between the first mold part and each second mold part; means for moving said mold parts in a direction of moving between engaging, mold cavity -forming relation and spaced relation to alternatingly mold and to remove product molded therein; and sprue means to provide molten molding compound to each mold cavity, the improvement comprising, in combination:
    said sprue means comprising a first sprue conduit extending through one of said second mold parts and communicating between a source of molten molding compound and one of said mold cavities, a second sprue conduit communicating between said first sprue conduit and the other mold cavity through said first mold part, and gate, means conduit.

2. The injection mold of claim 1 in which said first and second sprue conduits communicate with each other in essentially linear, straight relation, said sprue conduits being free of any sharp turns.

3. The injection mold of claim 2 in which said sprue conduits extend in the direction of moving of said mold parts.

4. The injection mold of claim 1 in which said gate means comprises a rotatable member positioned within said first mold part; a passageway extending centrally through said rotatable said member passageway comprising at least a portion of said second sprue conduit; and means for rotating said rotatable member between a first rotary position in which said passageway is in communication between the first sprue conduit and the other mold cavity, and a second rotary position in which said passageway is out of said communication.

5. The injection mold of claim 4 in which said rotatable member is substantially spherical in shape, said rotatable member defining a recess on its spherical surface that communicates with the one of said mold cavities in the second rotary position, to facilitate distribution of molten molding compound from the first sprue conduit into the one mold cavity.

6. The injection mold of claim 5 in which said recess is of substantially circular periphery.

7. The injection mold of claim 5 in which said passageway is essentially sealed from the one mold cavity in the first rotary position.

8. The injection mold of claim 4 in which means are provided for removing molding compound from said passageway while the rotatable member is in the second rotary position.

9. The injection mold of claim 8 in which means are provided for cooling said rotatable member to cause molding compound in said passageway to harden.

10. The injection mold of claim 4 in which means are provided for heating said rotatable member to retain molding compound in said passageway in molten condition.

11. The injection mold of claim 10 in which said rotatable member is substantially spherical in shape.

12. The injection mold of claim 11 in which said passageway communicates with the one mold cavity in the first rotary position, whereby both molding chambers can be filled with molding compound in a single shot.

13. The injection mold of claim 4 in which said rotatable member is of substantially spherical shape.

14. In a multiple cavity injection mold which defines an inner, first mold part positioned between a pair of second mold parts to define a pair of separate mold cavities respectively positioned between the first mold part and each second mold part; means for moving said mold parts in a direction of moving between engaging, mold cavity-forming relation and spaced relation to alternatingly mold and to remove product molded therein; and sprue means to provide molten molding compound to each mold cavity, the improvement comprising, in combination:

said sprue means comprising a first sprue conduit extending through one of said second mold parts and communicating between a source of molten molding compound and one of said mold cavities, a second sprue conduit extending through said first mold part and being in communication between said first sprue conduit and the other mold cavity, said first and second sprue conduits communicating with other in essentially linear, straight relation, and gate means controlling flow through at least said second sprue conduit, said gate means comprising a rotatable member positioned within said first mold part; a passageway extending centrally through said rotatable member and comprising at least a portion of said second sprue conduit; and means for rotating said rotatable member between a first rotary position in which said passageway is in communication between the first sprue conduit and the other mold cavity, and a second rotary position in which said passageway is out of said communication.

15. The injection mold of claim 14 in which said sprue conduits extend in the direction of moving of said mold parts, said sprue conduits being free of any sharp turns.

16. The injection mold of claim 15 in which said rotatable member is substantially spherical in shape, said rotatable member defining a recess on its spherical surface that communicates with the one mold cavity in the second rotary position, to facilitate the distribution of molten molding compound from the first sprue conduit into the one of said mold cavities.

17. The injection mold of claim 16 in which said passageway is essentially sealed from the one mold cavity in the first rotary position.

18. The injection mold of claim 17 in which plunger means are provided for removing molding compound from said passageway while the rotatable member is in the secondary rotary position.

19. The injection mold of claim 18 in which means are provided for cooling said rotatable member to cause molding compound in said passageway to harden.

20. The injection mold of claim 15 in which means are provided for heating said rotatable member to retain molding compound in said passageway in molten condition.

21. The injection mold of claim 20 in which said rotatable member is substantially spherical in shape.

22. The injection mold of claim 21 in which said passageway communicates with the one of said mold cavities in the first rotary position, whereby both molding chambers can be filled with molding compound in a single shot.

23. In an injection mold which defines a first mold part and a second mold part which together define a mold cavity between them; means for moving said mold parts between engaging, mold cavity-forming relation and spaced relation to alternatingly mold and to remove product molded therein; and sprue means to provide molten molding compound to said mold cavity, the improvement comprising, in combination: said sprue means comprising a first sprue conduit communicating between a source of molten molding compound and a second sprue conduit, said first and second sprue conduits communicating with each other in essentially linear, straight relation, said second sprue conduit communicating between the first sprue conduit and the mold cavity, said second sprue conduit comprising a passageway extending centrally through a rotatable member; means for rotating said rotatable member between a first rotary position in which said passageway is in communication between the first sprue conduit and the mold cavity, and a second rotary position in which said passageway is out of said communication, said rotatable member being substantially spherical in shape, said spherical rotatable member defining a circular recess on its spherical surface that communicates with the mold cavity in the second rotary position, to facilitate distribution of molten molding compound from the first sprue conduit into the mold cavity.

24. The injection mold of claim 23 in which means are provided for heating said rotatable member to retain molding compound in said passageway in molten condition, outer portions of said rotatable member comprising insulating material, whereby said rotatable member can rotate to present said insulating material to said mold cavity in the second rotary position.

* * * * *

UNITED STATES PATENT AND TRADEMARK OFFICE
CERTIFICATE OF CORRECTION

PATENT NO. : 5,169,655

DATED : December 8, 1992

INVENTOR(S) : John W. Von Holdt, Sr.

It is certified that error appears in the above-identified patent and that said Letters Patent is hereby corrected as shown below:

Column 6, line 67, cancel the comma after "gate"; after "means" insert -- controlling flow through at least said second sprue --.

Column 8, line 30, cancel "secondary", and insert in place thereof -- second --.

Signed and Sealed this

Nineteenth Day of July, 1994

Attest:

BRUCE LEHMAN

*Attesting Officer*  *Commissioner of Patents and Trademarks*